United States Patent [19]

Cathey

[11] Patent Number: 4,506,853
[45] Date of Patent: Mar. 26, 1985

[54] HOSE HOLDER

[76] Inventor: Kenneth M. Cathey, 249E Upland Ave., Absecon, N.J. 08201

[21] Appl. No.: 453,472

[22] Filed: Dec. 27, 1982

[51] Int. Cl.³ ............................................. A62C 23/04
[52] U.S. Cl. ....................................... 248/79; 248/90; 248/129
[58] Field of Search ................ 248/75, 76, 79, 89, 248/90; 242/129; 220/85 R; 312/100, 237

[56] References Cited

U.S. PATENT DOCUMENTS

| | | | |
|---|---|---|---|
| 593,745 | 11/1897 | Hughes | 242/129 |
| 1,869,284 | 7/1932 | Swanson | 220/85 R |
| 2,384,174 | 9/1945 | Jones | 248/79 X |
| 2,681,251 | 6/1954 | Fortener | 248/89 X |
| 2,725,208 | 11/1955 | Bova | 248/89 |
| 3,240,407 | 3/1966 | Boak | 248/140 |
| 4,253,716 | 3/1981 | Turner | 248/79 X |
| 4,277,035 | 7/1981 | Gaski | 242/129 X |
| 4,437,625 | 3/1984 | Vansickle | 242/129 |

Primary Examiner—J. Franklin Foss
Attorney, Agent, or Firm—Thomas A. Lennox

[57] ABSTRACT

A hose holder to hang on an acetylene and oxygen pressurized tanks used for welding, the holder being capable or removal and storage away from the tank including a body member held vertically along side of the cylinder, a ring to hang over the top of the cylinder, around the valve, U-shaped support members extending horizontally to rest on the side of the cylinder and a hose holding device attached to the body including an upright U-shaped member and an inverted U-shaped member around which the hose is wound.

9 Claims, 3 Drawing Figures

U.S. Patent   Mar. 26, 1985   4,506,853
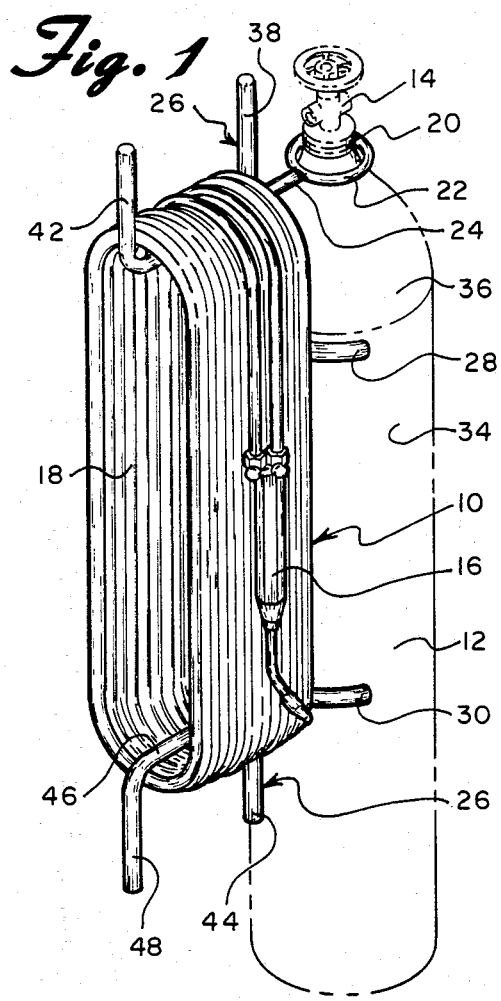
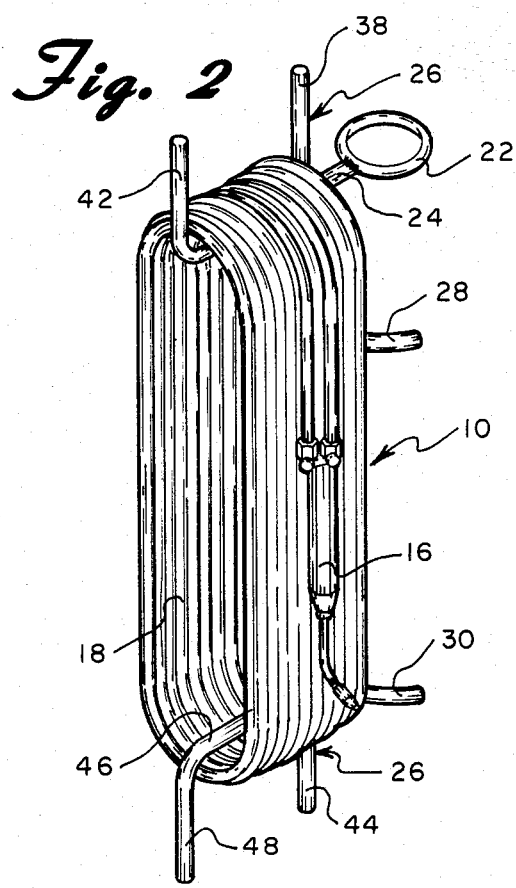
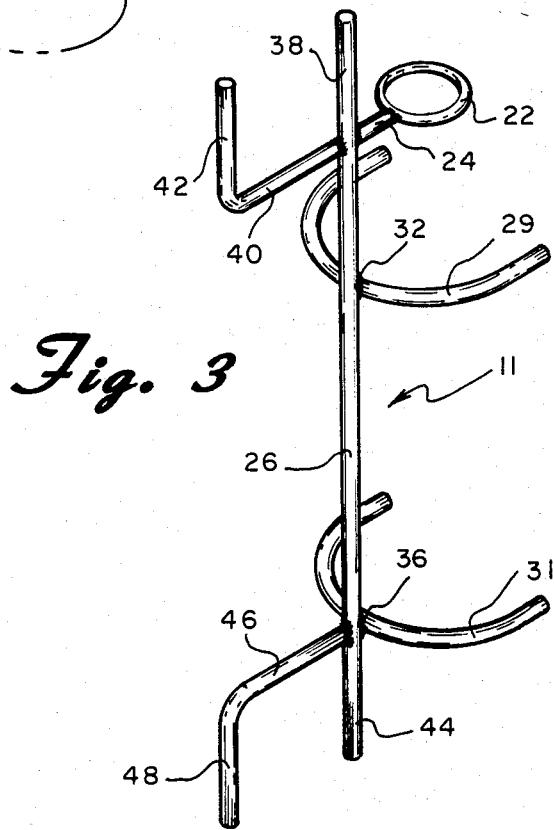

HOSE HOLDER

BACKGROUND OF THE INVENTION

This invention relates to a holder for the hoses used and connected to pressurized containers, specifically the iron and steel cylinders containing actylene, butane, methane and oxygen.

In particular, this invention is a hose holder to hold and store the flexible hose connected to the mixing valve which is in turn connected to an actylene tank cylinder and an oxygen tank. The standard oxygen cylinder is usually utilized while standing in an upright position and stands about four and a half feet high with a diameter of about nine inches. The actylene tanks are usually lower in height and about one foot in diameter. Each cylinder is equipped at the top with a valve which is connected by pressure tubing to a mixing valve and pressure regulator and then to a pair of hoses which connect to the welding and cutting tip for use in brazing, arc welding and cutting operations. In the past, the pressure tubing to the tip is merely wound around the cylinders when not in use. If less than the full length of the tubing is used, the balance remains looped around the cylinders. Vandalism and theft are major problems. In addition, control valves, the tubing and tips may belong to the welder himself while the cylinders are being provided at the job site, so that the welder will wish to carry the hoses away from the job site.

A variety of hose clamps, hose reels and hose hangers have been provided, but none satisfy the needs suggested above, the following objects, and the advantages of the present invention.

SUMMARY OF THE INVENTION

An object of this invention is to provide a hose holder which will hang on gas cylinders while in use.

An additional object of this invention is to provide a hose holder that is easily removable without any need to disconnect the holder from the cylinder.

A further object of this invention is to provide a hose holder which will attach to the cylinder without damaging it in any way.

An additional object of this invention is to provide a hose holder which will hold the hose even if the holder is inverted and stored in any position.

A further object of this invention is to provide a hose holder which can be easily carried in the hand without the addition of further handles or carrying apparatus.

The hose holder of this invention is provided for use on pressurized cylinders equipped with valves on the top. The holder includes a body member positioned essentially vertically along the side of the cylinder. A ring device is structurally attached to the body member and extends essentially horizontally from the body member to mount on the top of the cylinder while surrounding the valve and resting on the top of the cylinder. A support device is connected to the body member below the ring device with the support device resting against the outside surface of the cylinder. A hose holding device is structurally attached to the body member to allow the pressurized hose to be hung on, be positioned next to the body member and wrapped around the holding device such that the hose will stay on the holding device even if the holder is inverted.

BRIEF DESCRIPTION OF THE DRAWINGS

FIG. 1 is a perspective view illustrating a gas cylinder on which the hose holder of the present invention is hung while holding the hose.

FIG. 2 is a perspective view of the hose holder of the present invention holding the hose but after removal from the cylinder.

FIG. 3 is a perspective view of a second hose holder embodiment of the present invention.

DESCRIPTION OF PREFERRED EMBODIMENTS

In FIG. 1, hose holder 10 of the present invention is shown attached to and resting on cylinder 12 holding standard pressure hose 18, a dual length capable of having one end of one of the hoses connected to valve 14 or to a gauge and valve assembly and the other connected to a second tank, all not illustrated. The free ends of hose 18 are connected to mixer and tip 16 which may be designed for oxy-actylene work or any number of other combinations for use in metal welding and cutting operations. The standard upright cylinders containing oxygen and flammable gases are iron and steel pressurized tanks similar to that of cylinder 12. For safety reasons, essentially all equipped at the top with a collar with outside threads equipped to receive a safety protection cap. Collar 20 with the threads is about 3 inches in diameter and is illustrated at the top of tank 12 around which a 4½ inch diameter ring 22 rests on the top and upper shoulders of cylinder 12. The diameter of the opening of ring 22 is chosen to be large enough to easily fit around and pass over the threads of collar 20, which is typically 2½ to 4 inches in diameter, and rest on the top of tank 12. Ring 22 is constructed of one-half inch pipe to be sufficient to support the hose holder 10 and large enough to not easily damage the threads of collar 20 if it is pulled up against the threads. Ring 22 is welded to horizontal cantelever support 24 which is connected directly to vertical body member 26. These members and essentially all members of holder 10 are constructed of one-half inch diameter steel pipe with each joint welded to form the one pine holder 10. Upper support member 26 is a curved member with a curve diameter slightly larger than the outside diameter of cylinder 12, with a shape to rest against the outside surface of cylinder 12. The shape of support 28 is such to provide contact with the surface of cylinder 12 in a horizontal plane and as such resists movement of body member 26 away from the vertical position in a plane parallel with the vertical axis of the tank. Although support 28 may be a mere point contact with the tank surface, it is preferred that support 28, and in fact, lower support 30, contact the outside surface of the tank in a horizontal plane. It is preferred that supports 28 and 30 extend to contact up to about 180 degrees of the circumference of the tank in a horizontal plane. This preferred embodiment of holder 11 is illustrated in FIG. 3, which in every respect is identical to the hose holder 10 illustrated in FIGS. 1 and 2 except the shapes of upper support 29 and lower support 31. Upper support 28, and its counterpart support 29, is welded to body member 26 at point 32 vertically positioned below the ring 22 and thus below collar 20 at a point to rest on the essentially vertical surface 34 of cylinder 12 below shoulder 36 of the cylinder. Likewise, lower support member 30, and its counterpart support 31 of the FIG. 3 embodiment, is welded at point 36 on body member 26 at a level vertically below and close to the lower extremity of body member 26. Upper end 38 extends upwardly to a height near to or above the 14. This upper end 38 forms part of an upright "U" shape formed together with horizontal member 40 and vertical upright member 42 all structurally attached and welded to body member 26. Similarly, the lower end 44 of body member 26 forms part of an inverted "U" shape together with lower horizontal member 46 and vertical downwardly extending member 48. Thus, the combination of the upper upright "U" shape and the lower inverted "U" shape allows hose 18 to be wound around over horizontal member 40 and under lower horizontal member 46 to pile up and be held horizontally by the vertical members of the "U" shapes. As pictured in FIG. 2, hose holder 10 may be lifted off of cylinder 12 with hose 18 in place and stored in a safe place away from vandals or even taken away from the work site for safe keeping. Although not shown, tip mechanism 16 may be hooked under a lap of hose 18 so that it does not unravel. Holder 10 may be easily carried by grasping the center of body member 26 and carrying it to a safe storage place. For simplicity, the various parts of hose holder 11 as pictured in FIG. 3 that are identical to that of hose holder 10 pictured in FIGS. 1 and 2 are numbered identically. Only upper support 29 and lower support 31 differ in construction and every other detail is identical to that of holder 10.

A preferred embodiment of the present invention is a hose holder for pressurized cylinders including a body member positioned vertically along the side of the cylinder. The preferred body member is a single straight member of a length up to about the length of the cylinder. A cantelever member attached to the body member extends toward the top of the cylinder. A ring member structurally connected to the outermost end of the cantelever member with an opening of a size to surround the valve and rest on the top of the cylinder. The preferred ring is attached to a cantelever member and extends horizontally with an inside diameter of about 3 to about 6 inches. The cross section and essentially the outer surface of the ring is preferably of a shape and size sufficient to essentially avoid damaging the threads on the outside of a collar at the top of pressurized cylinders. Specifically preferred is a round shape wherein the ring is essentially a donut with the cross sectional diameter of the ring member being at least one-half inch in diameter. At least two support devices connected to the body member below the ring rests against the outside surface of the tank and at least partially surround the tank to abut the outside surface in a horizontal direction. Particularly preferred support devices extend horizontally around the surface of the cylinder in a range of about 90 to 100 degrees of the circumference of the cylinder. Particularly preferred are support devices including a U-shaped member positioned horizontally of a diameter to contact up to about 180 degrees of the circumference of the cylinder. The U-shaped member may have straight extensions extending well beyond the hemi-circular contact. An upright U-shaped upper member formed with or attached to the upper portion of the body member extending away from the cylinder plus an inverted U-shaped lower member formed with or attached at a lower extremity to the body member. The U-shapes preferably extend away from the cylinder to form a place for winding the tubing.

While this invention has been described with reference to the specific embodiments disclosed herein, it is not confined to the details set forth and the patent is intended to include modifications and changes which may come within and extend from the following claims.

I claim:

1. A hose holder for pressurized cylinders with top located valves comprising:
   (a) a body member positioned essentially vertically along the side of the cylinder,
   (b) a ring means structually attached and extending essentially horizontally from the body member to mount on the top of the cylinder, surrounding the valve and resting on the top of the cylinder,
   (c) at least one support means connected to the body member below the ring means to rest against at least partially surrounds the outside side surface of the cylinder, and
   (d) a hose holding means structurally attached to the body member to allow the pressurized hose to be hung on, and wherein the hose holding means comprises an upright "U" shaped upper member formed with or attached to an upper portion of the body member and an inverted "U" shaped lower member formed with or attached to a lower portion of the body member.

2. The holder of claim 1 wherein the body member is a single straight member of a length up to about the length of a cylinder.

3. The holder of claim 1 wherein the ring means comprises a metal ring with an inside diameter of about 3 to about 6 inches.

4. The holder of claim 1 wherein the ring means comprises a cantelever member structurally attached and extending horizontally from the body member with a metal ring structurally attached to the outside end extending horizontally.

5. The holder of claim 1 wherein the ring means comprises a ring having a cross-sectional shape and size sufficient to essentially avoid damaging threads on the outside of a collar at the top of pressurized cylinders.

6. The holder of claim 1 wherein there are at least two support means.

7. The holder of claim 1 wherein the support means extend horizontally around the surface of a cylinder in the range of about 90 to 180 degrees of the cylinder.

8. The holder of claim 1 wherein the support means is a U-shaped member positioned horizontally of a diameter to contact up to about 180 degrees of the circumference of the cylinder.

9. A hose holder for pressurized tanks with valves located at the top, comprising:
   (a) a body member positioned vertically along the side of the tank,
   (b) a cantelever member attached to the body member extending toward the top of the tank,
   (c) a ring axially connected to the outermost end of the cantelever member having an opening of a size to surround the valve and rest upon the top of the tank,
   (d) at least two support means connected to the body member below the ring to rest against the outside side surface of the tank and at least partially surround the tank to abut the outside surface in a horizontal direction,
   (e) an upright "U" shaped upper member formed with or attached to an upper portion of the body member and extending away from the tank, and
   (f) an inverted "U" shaped lower member formed with or attached to the body member at a lower extremity and extending away from the tank.

* * * * *